US012796593B2

(12) United States Patent
Pirilä

(10) Patent No.: US 12,796,593 B2
(45) Date of Patent: Nov. 17, 2026

(54) SPORTS FIELD MAINTENANCE SYSTEM AND METHOD FOR MAINTAINING SPORTS FIELD

(71) Applicant: ICE guard Oy, Kalanti AS (FI)

(72) Inventor: Timo Pirilä, Kalanti AS (FI)

(73) Assignee: ICE guard Oy, Kalanti AS (FI)

( * ) Notice: Subject to any disclaimer, the term of this patent is extended or adjusted under 35 U.S.C. 154(b) by 428 days.

(21) Appl. No.: 18/564,738

(22) PCT Filed: May 31, 2022

(86) PCT No.: PCT/FI2022/050372

§ 371 (c)(1),
(2) Date: Nov. 28, 2023

(87) PCT Pub. No.: WO2022/254090

PCT Pub. Date: Dec. 8, 2022

(65) Prior Publication Data

US 2024/0251703 A1 Aug. 1, 2024

(30) Foreign Application Priority Data

May 31, 2021 (FI) ...................................... 20217101

(51) Int. Cl.
*A01D 34/00* (2006.01)
*A01D 101/00* (2006.01)

(52) U.S. Cl.
CPC ........ *A01D 34/008* (2013.01); *A01D 2101/00* (2013.01)

(58) Field of Classification Search
CPC .. A01D 34/00; A01D 34/008; A01D 2101/00; E01H 4/00; E01H 4/023; G05D 1/00; G05D 1/2235; G05D 2105/12; G05D 2105/15; G05D 2107/24; G05D 2109/10
USPC ............................................................ 701/50
See application file for complete search history.

(56) References Cited

U.S. PATENT DOCUMENTS

| | | | | |
|---|---|---|---|---|
| 3,302,975 A | | 2/1967 | Vandenberg | |
| 3,591,236 A | * | 7/1971 | Jones | E01H 4/023 299/24 |
| 3,622,205 A | * | 11/1971 | Zamboni | E01H 4/023 37/219 |
| 7,124,521 B1 | * | 10/2006 | Medoro | E01H 4/023 37/285 |

(Continued)

FOREIGN PATENT DOCUMENTS

| | | | | | |
|---|---|---|---|---|---|
| CA | 2354960 C | * | 12/2004 | | A01D 34/64 |
| CA | 2637116 A1 | * | 11/2009 | | |

(Continued)

OTHER PUBLICATIONS

Finnish Patent and Registraion Office, Search Report, Application No. 20217101, dated Nov. 16, 2021, 2 pages.

(Continued)

*Primary Examiner* — Atul Trivedi
(74) *Attorney, Agent, or Firm* — ZIEGLER IP LAW GROUP, LLC.

(57) ABSTRACT

A sports field maintenance system and a method for maintaining a sports field includes maintaining the first part of the field with an actuator of a remotely controlled sports field maintenance device and maintaining the second part of the field with an additional device.

20 Claims, 3 Drawing Sheets

(56) References Cited

U.S. PATENT DOCUMENTS

| | | | | |
|---|---|---|---|---|
| 12,546,073 | B2 * | 2/2026 | Mcintosh | E01H 4/023 |
| 2010/0037492 | A1 * | 2/2010 | Manion | E01H 4/023 37/219 |
| 2010/0314141 | A1 | 12/2010 | Merkt | |
| 2012/0124795 | A1 * | 5/2012 | Pogorzelski | E01H 4/023 37/219 |
| 2014/0237862 | A1 * | 8/2014 | van Eijl | E01H 4/023 37/197 |
| 2017/0038772 | A1 | 2/2017 | Ratanaphanyarat et al. | |
| 2017/0073915 | A1 * | 3/2017 | van Eijl | E01H 4/023 |
| 2018/0255705 | A1 | 9/2018 | Keski-Luopa et al. | |
| 2019/0389519 | A1 | 12/2019 | Bergsten et al. | |
| 2020/0002909 | A1 * | 1/2020 | Sears | E01H 4/023 |
| 2020/0309521 | A1 | 10/2020 | Bremer | |
| 2020/0396892 | A1 * | 12/2020 | Frodigh | A01G 25/00 |
| 2022/0397235 | A1 * | 12/2022 | McHugh | F16M 13/022 |
| 2023/0340739 | A1 * | 10/2023 | Mcintosh | E01H 4/023 |
| 2024/0251703 | A1 * | 8/2024 | Pirilä | A01D 34/008 |
| 2026/0026433 | A1 * | 1/2026 | Ogburn | A01D 34/733 |

FOREIGN PATENT DOCUMENTS

| | | | | | |
|---|---|---|---|---|---|
| CA | 2690767 | A1 | * | 7/2011 | E01H 4/023 |
| CA | 2757784 | A1 | * | 10/2012 | B26D 7/2614 |
| CA | 2798502 | A1 | * | 6/2014 | E01H 4/023 |
| CA | 3197439 | A1 | * | 10/2023 | E91H 4/02 |
| CN | 112458993 | A | * | 3/2021 | E01H 4/023 |
| CN | 215405839 | U | * | 1/2022 | |
| CN | 215405840 | U | * | 1/2022 | |
| CN | 222578565 | U | * | 3/2025 | |
| DE | 102014013074 | A1 | * | 3/2016 | E01H 4/023 |
| IT | 202200019047 | A1 | * | 3/2024 | E01H 4/023 |
| KR | 20170118420 | A | * | 10/2017 | F25C 3/02 |
| WO | WO-02093106 | A1 | * | 11/2002 | E01C 19/006 |
| WO | WO-2007059553 | A1 | * | 5/2007 | A63C 17/016 |
| WO | WO-2014172129 | A1 | * | 10/2014 | E01H 4/023 |
| WO | 2015173825 | A1 | | 11/2015 | |
| WO | 2016186933 | A2 | | 11/2016 | |
| WO | WO-2017197089 | A1 | * | 11/2017 | E01H 5/12 |
| WO | 2019164329 | A1 | | 8/2019 | |
| WO | WO-2020161001 | A1 | * | 8/2020 | A01D 34/54 |
| WO | WO-2023010045 | A2 | * | 2/2023 | G05D 1/222 |

OTHER PUBLICATIONS

Finnish Patent and Registration Office, International Search Report, International Application No. PCT/FI2022/050372, mailed Sep. 13, 2022, 12 pages.

* cited by examiner

SPORTS FIELD MAINTENANCE SYSTEM AND METHOD FOR MAINTAINING SPORTS FIELD

TECHNICAL FIELD

The aspects of the disclosed embodiments relate to a sports field maintenance system and a method for maintaining a sports field as presented in the preambles of the independent claims presented below.

TECHNICAL BACKGROUND

A typical ice resurfacer is driven on the ice of a sports field. The machine has a planer whose working depth and position, i.e. the amount of ice removed with the planer, can be controlled. In addition, the ice resurfacer usually has a water tank and equipment for feeding the desired amount of water to the ice that has already been treated by the machine. On a typical ice rink, ice wears and forms unevenly. For example, an ice layer thicker than in the center of the rink tends to accumulate near the boards of the rink. Uneven ice hinders the use of the field and makes it difficult to maintain it. A thick layer of ice increases the consumption of energy used in freezing. Maintaining uneven ice may require use of a large amount of water in the maintenance.

Grass fields must be maintained regularly. For example, the grass must be cut to a certain height.

There is also other work that can be done mechanically on sports fields. For example, it is sometimes necessary to move tools or sports equipment from one place to another. One sports field can have several different maintenance devices for performing different tasks.

WO 2017197089 A1 and US 2020309521 A1 present sports field maintenance devices.

SUMMARY

The aspects of the disclosed embodiments are directed to reducing or even eliminating the above-mentioned problems appearing in prior art.

One aspect of the disclosed embodiments is to create a solution by which the maintenance of a sports field becomes easier than at present and the quality of the maintenance is better than at present.

Another aspect of the disclosed embodiments is to create a more reliable and efficient way of maintaining a sports field than before.

BRIEF DESCRIPTION OF THE DISCLOSED EMBODIMENTS

Among other things, to achieve the objects mentioned above, the maintenance system, method and other aspects of the disclosed embodiments are characterized by what is presented in the attached independent claims.

Where applicable, embodiments and advantages mentioned in this text pertain to the maintenance system, method and other aspects of the disclosed embodiments even though it might not always be specifically mentioned.

A typical sports field maintenance system comprises, a remotely operated sports field maintenance device comprising an actuator for maintaining the first part of the field, and an additional device for maintaining the second part of the field.

One remotely operated sports field maintenance device according to the aspects of the disclosed embodiments used in a sports field maintenance system comprises a body and, supported on it moving devices for moving the maintenance device on the surface of the maintained field at a desired route and speed;

at least one actuator for maintaining the field as desired;

actuator control devices for controlling the position, working height and/or location of the actuator as desired in relation to the body and/or a fixed point outside the maintenance device;

a shell, for protecting the maintenance device and/or for attaching the actuator. The field maintenance device and its moving devices, actuator and actuator control devices are remotely operated.

The maintenance device or the additional device can be, for example, a known per se device intended for maintaining an ice field, grass field, snow field, sand field or a sports field covered with something else, or it can comprise actuators and functionalities of one or more of the aforementioned devices. Not all principles of operation of the aforementioned maintenance devices are reviewed in this text.

Moving devices can comprise, for example, a power source such as a battery, fuel tank, engine, power transmission, wheels, control devices, necessary devices and automation to control them.

An actuator for maintaining the field can be, for example, an ice or grass cutting device, a leveling device, an irrigation device, a painting device, a grinding device. An actuator can be a means of transporting things such as sports equipment. An actuator can be a photographing device or a recording device, for example a camera such as a TV camera or other video camera. An actuator can be a reproduction device, for example a sound reproduction device or an image reproduction device such as a display device, for example a scoreboard of a sports competition. An actuator can be a solar panel or other power generation device.

Actuator control devices can comprise, for example, adjusting screws, cylinders or other devices to change the position and location of the actuators. For example, it is necessary to be able to set the height position of the blades of an ice maintenance device or a grass cutting device as desired. The actuator control devices can be used to control, for example, the direction and/or height of the display device or camera. Actuator control devices can comprise e.g. a laser-operated height level indicator, which is known per se, and with the help of the laser beam emitted by the level indicator, the working height of the actuator of the control device can be controlled as desired in relation to a fixed point outside the maintenance device. Actuator control devices can comprise a positioning device, for example GPS positioning devices.

A shell supported on the body covers parts of the maintenance device to protect them from, for example, weather and debris. For example, one or more actuators of the maintenance device or actuator control devices can also be attached to the shell.

The field maintenance device and its moving devices, actuator and actuator control devices are remotely operated. In other words, the maintenance device can be said to be a robot that can work automatically. The maintenance device therefore does not necessarily need human intervention in a normal usage situation.

In one embodiment, the actuator can be replaced according to the maintenance need. The same maintenance device can therefore be equipped, for example, with either ice maintenance devices or grass field maintenance devices.

In one embodiment of the, the shell or its part is equipped with openable fastening means. In this way, the removable shell or part of it can be replaced to enable the protecting function and/or changing of the actuator of the maintenance device. For example, for outdoor use, the shell can be waterproof, or it can have solar panels installed into it to generate electricity, for example to charge the battery of the maintenance device.

In one embodiment, the openable fasteners are quick connectors. They can be opened and closed even completely without tools, just by hand or remotely. In this way, changing the shell or its part or the actuator is particularly fast, easy and reliable.

In one embodiment, at least one actuator is attached to a removable shell or a part thereof, whereby the actuator of the maintenance device is arranged to be changed by changing the shell supported on the body or a part of it. Many different actuators can be attached to the shell, such as a grass or ice maintenance device or a camera. Equipment such as fasteners or a container for transporting things can be attached to a shell or a part of a shell. In this way, the maintenance device can be used as an aid when moving, for example, tools or equipment for sports competitions from one place to another.

In one embodiment, the actuator comprises a leveling device to set the height of the field surface as desired. The leveling device can be, for example, an ice or grass cutting device.

In one embodiment, at least one actuator is an ice maintenance device, and the maintenance device is arranged to set the ice surface to a desired height position along a certain working width of the actuator.

In one embodiment, at least one actuator is a grass maintenance device, and the maintenance device is arranged to set the surface of the grass to a desired height position along a certain working width of the actuator or to set the grass to a certain height.

In one embodiment, the maintenance device, for example in its front, can have a LED light strip or other display device that visually shows whether it succeeds in leveling the field surface to the desired height. For example, the display device can show three different signals: 1) The field surface is too low, 2) The field surface is at an optimal height, 3) The field surface is too high. Signals can be produced with, for example, one color, in which case different signals are indicated with, for example, different flashing rates or light intensity. The signals can also be produced in different colors. The same information can also be stored in the system's memory and displayed, for example, on the screen of the remote control. The information is helpful, for example, to the field maintenance staff for planning follow-up maintenance procedures.

In one embodiment, the sports field maintenance system comprises, in addition to the remotely operated sports field maintenance device:

A remote control to enter and/or monitor the control information of the maintenance device. The remote control can be specially made for this function, but a smartphone and its application or another computer and an application installed on it can also act as a remote control.

A computer that can process the control data of the maintenance device. The processor of a smartphone or other computer and the program running in its memory can receive user's instructions, retrieve pre-stored information from the memory, and form thereof maintenance device control information suitable for each situation, i.e. instruction codes for the control device and its parts.

Data transfer means for transferring control information between the computer, remote control, and maintenance device.

In one embodiment, the maintenance system comprises a laser-operated control device known per se, with which the working height of the actuator can be controlled as desired in relation to a fixed point outside the maintenance device.

In one embodiment, the maintenance system comprises one or more automatic maintenance device driving programs that can be selected and started by remote control. The automatic driving program comprises instruction codes for the moving devices, at least one actuator and actuator control devices, with help of which instruction codes the maintenance device automatically performs a certain series of maintenance procedures. The maintenance system can have different driving programs ready, for example for different fields, for different weather conditions, for different sports. For example, on the same ice field, it may be necessary to run a different program in different situations. For example, during a break in ice hockey matches, it is possible to run the maintenance device faster than between matches or at the end of the day. In use, it can be noticed that different rinks in the same hall may require a different program. For example, one or more of the following parameters can be changed between different driving programs:

Is a laser-operated height control device in use or not. For example, at high speed or in sunlight, it may not be possible;

Speed of the maintenance device;

Maximum cutting amount of the ice or grass cutting device of the field maintenance device of the maintenance device;

Desired height level of the field surface.

A typical method according to the aspects of the disclosed embodiments for maintaining a sports field comprises at least the following steps:

the first part of the field is maintained with an actuator of a remotely operated sports field maintenance device;

the second part of the field is maintained with an additional device.

In one embodiment, the method for managing a sports field comprises at least the following steps:

Moving the sports field maintenance device on the surface of the field to be maintained at the desired route and speed with the help of moving devices;

Maintaining the field with at least one actuator attached to the maintenance device;

Setting the position, working height and/or location of the actuator in relation to the body and/or fixed point outside the maintenance device as desired with the actuator control devices;

Protecting the maintenance device with a shell and/or attaching an actuator to the shell;

Remotely controlling the sports field maintenance device and its moving devices, actuator and actuator control devices via a computer and remote control.

In one embodiment, the same maintenance device can be equipped with either ice maintenance devices or grass field maintenance devices, in which case the actuator of the maintenance device is changed according to the maintenance need.

Thus, by changing the actuator, the same device can be used in different situations, for example in different seasons.

In one embodiment, at least one actuator is attached to the maintenance device with openable fastening means. By changing the actuator, the functionality of the maintenance device can easily be changed to another.

In one embodiment, at least one actuator is attached to the shell or part of it, which is attached to the body of the maintenance device with openable fastening means. In this case, in the method the protecting function and/or actuator of the maintenance device is changed by changing the shell or its part.

By changing the shell or part of the shell, it is easy to change the functionality of the maintenance device to another. For example, as needed, the shell of the maintenance device or part of the shell can be changed to suit outdoor areas and variable weather, or to suit constant weather indoors. In one embodiment, the shell of the maintenance device resembles the appearance of a car or other vehicle. A replaceable actuator, such as a field maintenance device, a camera or an object transport device, can be attached to a part of the shell that is easier to remove from the body than the rest of the shell, for example, in a shell part resembling the nose or front end of a vehicle. Under the part of the shell that is more difficult to remove, for example the shell representing the rear end of the vehicle, actuators and parts that are not meant to be replaced, such as the engine, battery or fuel tank can be protected.

If the shell of the maintenance device resembles the appearance of a car or other means of transport, by changing the shell or a part of the shell, the type and functionality of the means of transport described by the maintenance device can be changed to match the purpose of use. For example, a suitable shell for transporting goods such as sports equipment is a van, pickup, or truck, in which case the goods can be transported in its trunk. A maintenance device driven indoors can be set to resemble an electric zero-emission car model. When maintaining ice, the shell can resemble a traditional ice resurfacer.

In one embodiment, the method comprises at least the following steps:

selecting and starting the automatic driving program of the maintenance device by remote control, which program comprises instruction codes for moving devices, at least one actuator and actuator control devices, with the help of which the maintenance device automatically performs a series of maintenance procedures.

It is possible to select between several different driving programs. For example, the maintenance device can be set with a driving program to make one maintenance lap around the rink following the edges of the ice rink and to return to its storage location.

In one embodiment, the actuator is a field leveling device, which is used to set the height of the field surface as desired. The actuator can be, for example, an ice maintenance device, in which case the maintenance device is used to set the surface of the ice to the desired height position along a certain working width of the actuator.

In one embodiment, the working height of the actuator is set as desired in relation to a fixed point outside the maintenance device by means of a laser-operated control device known per se. The fixed point outside the maintenance device can be selected as permanent so that its location does not change.

In one embodiment, the method comprises at least the following steps:

setting the height of the field surface as desired on the first part of the field surface with the help of the mentioned remotely operated maintenance device;

setting the height of the field surface as desired on the second part of the field surface with the help of an additional device.

The additional device is something other than the remotely operated maintenance device according to the aspects of the disclosed embodiments. The additional device can be, for example, a manual, i.e. human-controlled, sports field maintenance device. For example, when maintaining an ice field, it can be economical to use the device according to the aspects of the disclosed embodiments to only maintain a certain part of the field, for example the edges, and to use a traditional efficient ice resurfacer to maintain the rest of the field.

In one embodiment, the additional device comprises an actuator for maintaining the second part of the field, and a working height setting device. With the working height setting device, the working height of the actuator of the additional device is set based on the level of the surface of the first part of the field that has already been maintained.

In one embodiment, the additional device comprises an automatic working height setting device. Such technology is known and will not be explained further here.

When the surface of the first part of the field is at the correct, desired level, the surface level of the second part of the field can be easily and accurately set as desired based on the surface level of the first part. The level of the surfaces of the first and second parts can be set as same. This feature may be needed, for example, when only the first part of the field to be maintained can or is wanted to be maintained with the mentioned remotely operated maintenance device and the second part must be maintained with the additional device.

In one embodiment on the first part of the field surface, the working height of the actuator of the maintenance device is set as desired in relation to the fixed point outside the maintenance device by means of a laser-operated control device;

on the second part of the field surface, the working height of the additional device is set as desired based on the height of the surface set to the desired height of the first part.

The working height of the actuator of the maintenance device according to the aspects of the disclosed embodiments can be accurately and easily set to the correct height with a laser-operated control device. There is no need for a laser actuator to set the working height of the second part, because the surface of the first part is already at the correct, desired level. The level of the surface of the second part can be easily and accurately taken from the level of the surface of the first part. Typically, the level of the surfaces of the first and second parts is set to be the same. In one embodiment, the maintenance device for the first part of the field is the mentioned remotely operated maintenance device, and the additional device that maintains the second part is, for example, a manual, i.e. human-controlled, sports field maintenance device. This feature may be needed, for example, when a laser actuator or a remotely operated maintenance device can only be used on the first part of the field.

In one embodiment the height of the ice field surface is set as desired on the first part of the field surface with the help of a remotely operated ice maintenance device;

the height of the ice field surface is set as desired on the second part of the field surface with the help of a human-driven ice resurfacer.

Indoor ice rinks typically already have large, efficient ice resurfacers. With them, leveling the ice is easy and fast, as long as the correct level of surface height is taken from the surface of the first part of the field leveled with the remotely operated maintenance device according to the aspects of the disclosed embodiments.

In one embodiment an ice resurfacer is driven over the first part of the field already partially set to the desired height, so that the ice resurfacer measures the height of the surface of the first part and sets the working height of its maintenance device to the same; and later the ice resurfacer is partially driven over the surface of the ice it has already laid so that the ice resurfacer measures the height of the ice surface it has already laid and sets the working height of its maintenance device to the same.

When the ice resurfacer has started leveling the surface of the second part of the field to the level of the first part, it can in the future measure the correct height level from the place it leveled itself. It is therefore sufficient that only part of the field surface is treated with the remotely operated maintenance device according to the aspects of the disclosed embodiments.

In one embodiment the first part of the field surface is the edge of an ice field equipped with a board, i.e. with the help of a remotely operated ice maintenance device, the surface of the field next to the board is leveled.

Next to the board of an ice rink is typically where the highest points of the ice are. With the remotely operated maintenance device according to the aspects of the disclosed embodiments, these highest points can be efficiently and easily leveled to the desired height.

The methods and embodiments mentioned above, suitable for a certain field material, such as ice or grass, are also suitable as applicable for materials other than those mentioned in each point.

BRIEF DESCRIPTION OF THE FIGURES

The aspects of the disclosed embodiments are explained more precisely in the following by referring to the attached schematic drawing, where.

DETAILED DESCRIPTION OF THE EXAMPLES IN THE FIGURES

For clarity, same reference numbers are used for some corresponding parts in different figures and embodiments.

Figure 3:
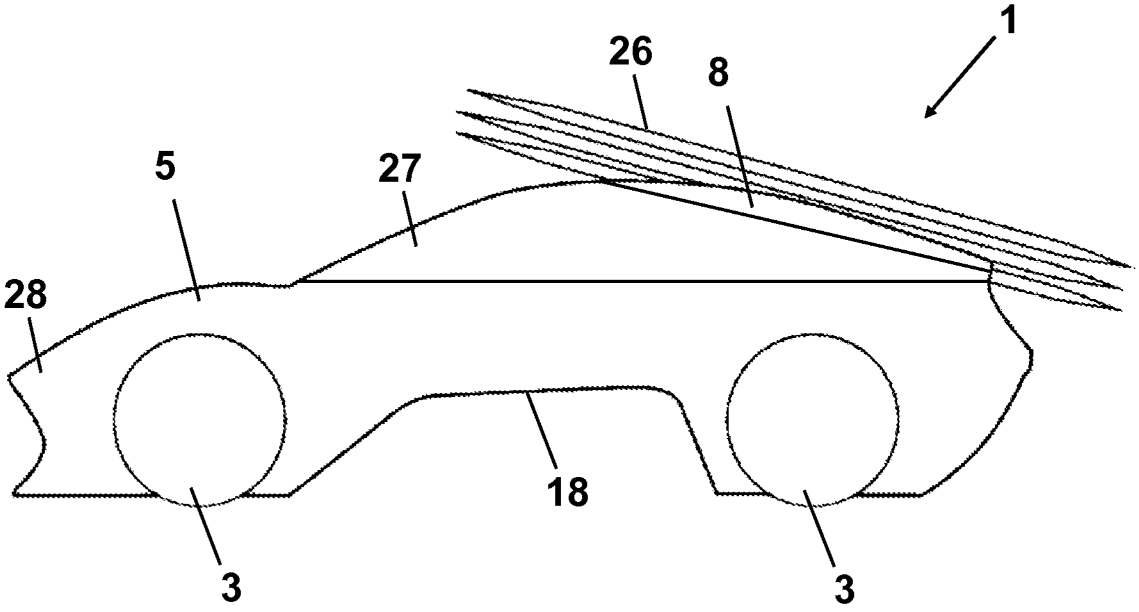
FIG. 3 depicts a maintenance device according to the aspects of the disclosed embodiments transporting objects.
Figure 4:
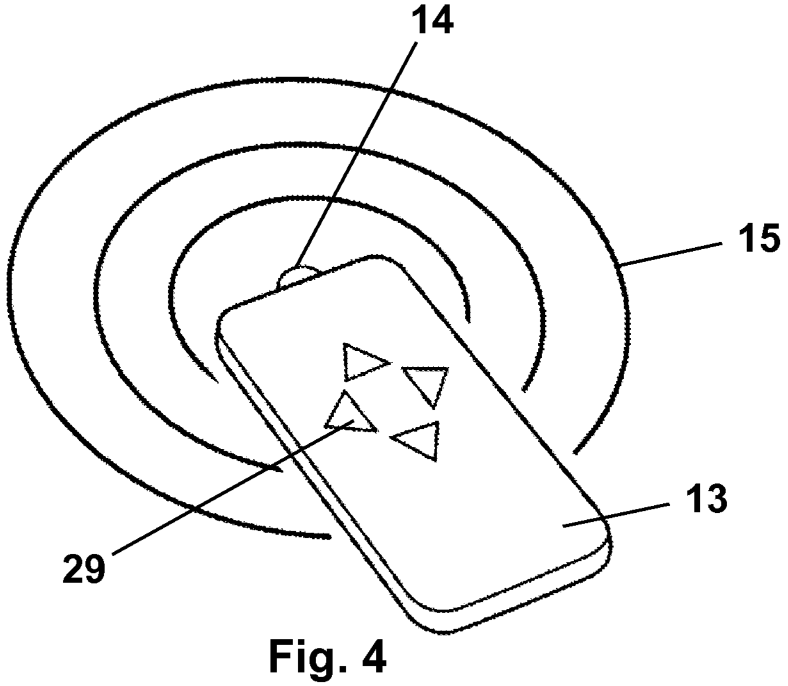
FIG. 4 depicts a remote control of the maintenance device according to the aspects of the disclosed embodiments.
Figure 5:
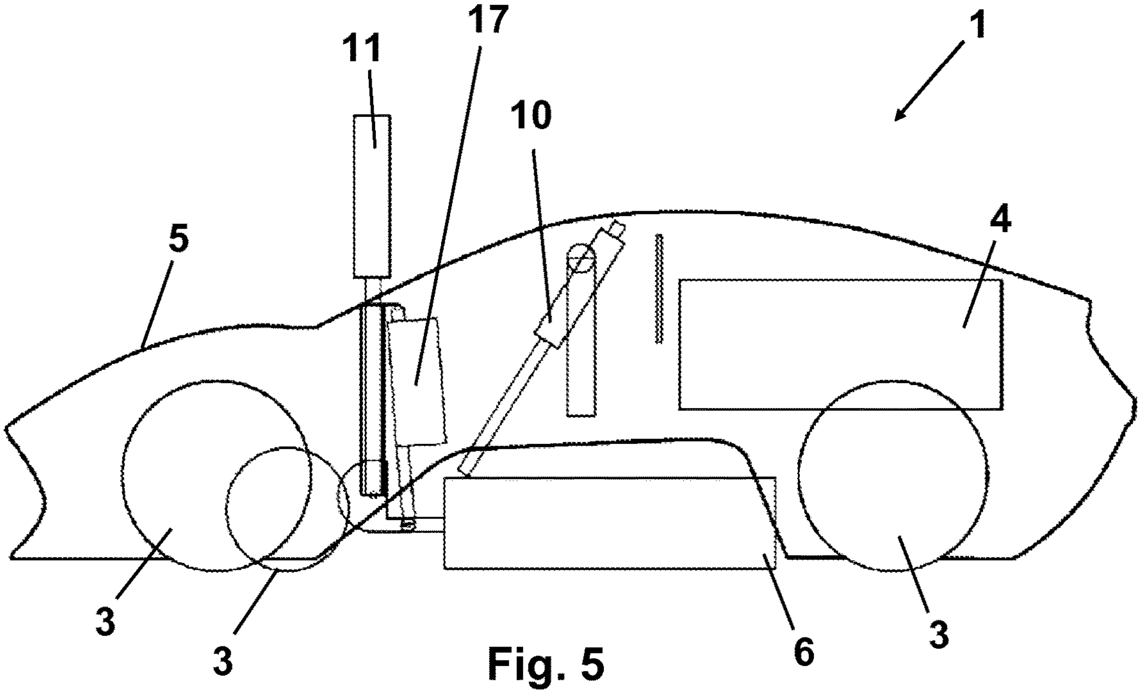
FIG. 5 depicts a cross-section of a maintenance device according to the aspects of the disclosed embodiments as viewed from the side.
Figure 6:
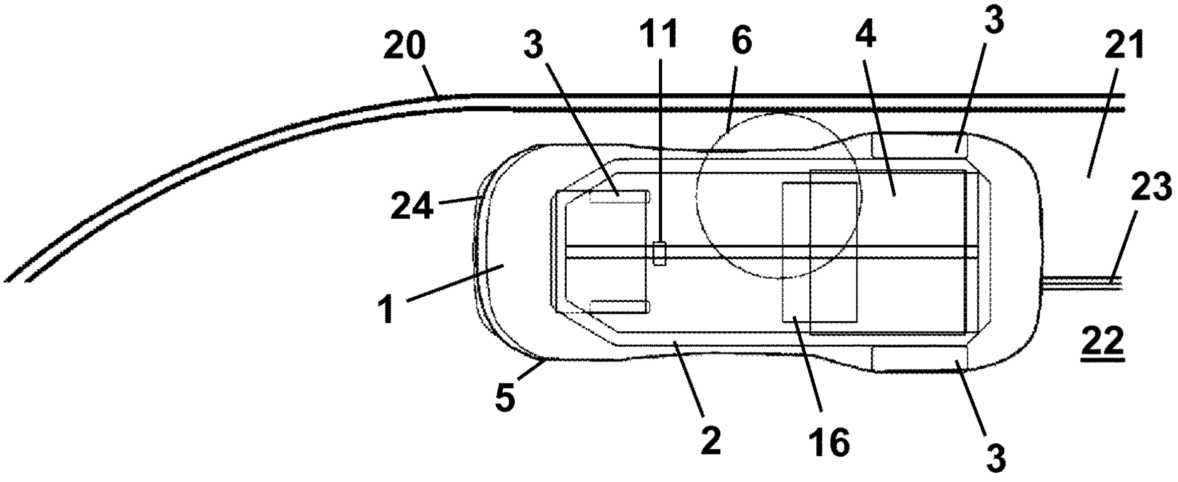
FIG. 6 depicts a maintenance device according to the aspects of the disclosed embodiments on an ice field as viewed from above.

FIGS. 1-6 depict various sports field maintenance devices 1 and parts of the maintenance system according to the aspects of the disclosed embodiments. A maintenance device comprises a body 2 and wheels 3 supported on it, as well as other moving devices needed to move the device. Other moving devices, such as an electric motor, a battery and necessary power transmission, are described in box 4 (FIGS. 5 and 6). A maintenance device shell 5, which in the examples in the figures resembles a car, is supported on the body. The shell 5 can be, for example, of plastic, metal or wood. It can be untreated or surface-treated with, for example, paint or varnish.

Figure 2:
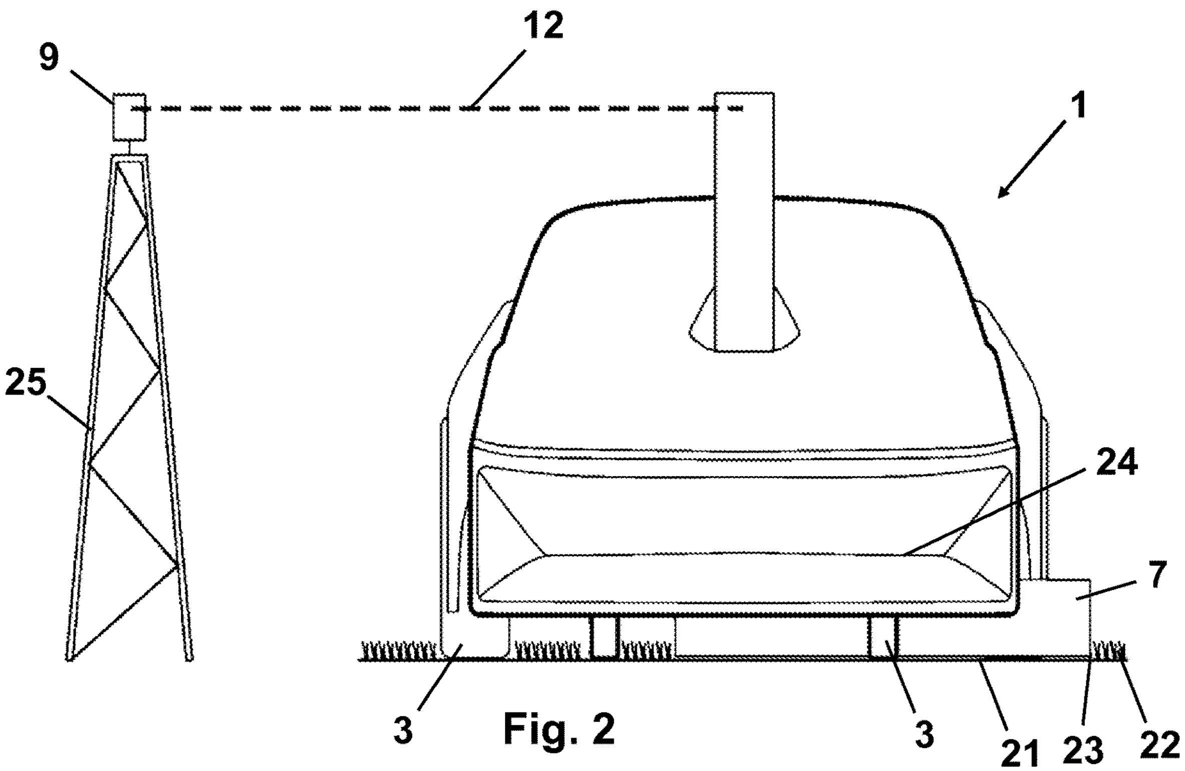
FIG. 2 depicts a maintenance device according to the aspects of the disclosed embodiments on a grass field.

Actuators are supported on the body 2 and/or the shell 5, such as an ice maintenance device 6 (FIGS. 1, 5 and 6), a grass field maintenance device 7 (FIG. 2), a sports equipment transport rack 8 (FIG. 3).

Figure 1:
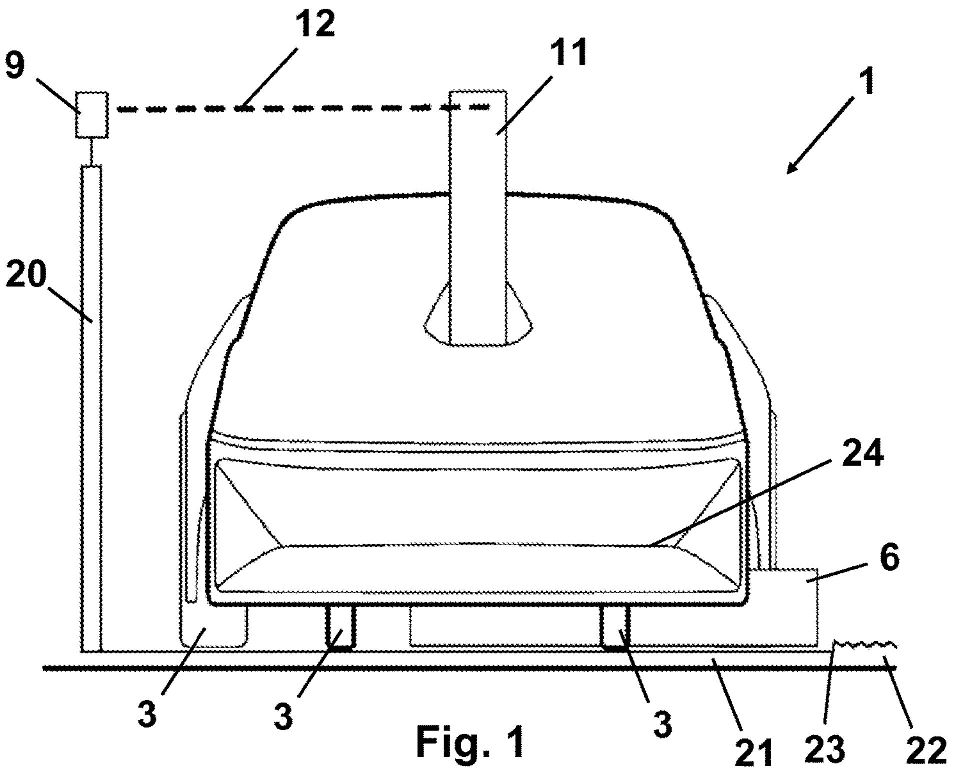
FIG. 1 depicts a maintenance device according to the aspects of the disclosed embodiments on an ice field.

Actuator control devices are supported on the body 2 and/or shell 5 of the maintenance device, which control devices are used to control position, working height and/or location of the actuator in use at any given time in relation to the maintenance device and/or a fixed point outside the maintenance device, such as a laser transmitter 9 (FIGS. 1 and 2). Actuator control devices are best seen in FIG. 5. Blade control devices 10 and 17 control the position of the cutting blade of the ice maintenance device 6. A laser receiver 11 receives a laser beam 12 sent from the laser transmitter 9 outside the maintenance device 1 (FIGS. 1 and 2), which laser beam is used to monitor and control the height position of an actuator such as an ice maintenance device 6 or the grass field maintenance device 7. The figures do not show computers or data transmission devices, with the help of which information needed to control and monitor the maintenance device 1 and its parts is transferred between different parts of the equipment.

The field maintenance device 1 according to the aspects of the disclosed embodiments and its moving devices 3 and 4, actuators 6, 7, and 8 and actuator control devices 10, 11, and 17 are all remotely operated. FIG. 4 shows a remote control 13 and a maintenance device control signal 15 sent by its radio transmitter antenna 14. A receiver (not shown) of the maintenance device 1 receives the control signal 15 and converts it with the computer 16 of the maintenance device into instruction codes that control the maintenance device 1, its moving devices 3 and 4, actuator control devices 10, 11 and 17 and actuators 6, 7 and 8.

In FIG. 1, the maintenance device 1 is close to the board 20 of the ice hockey rink. The ice maintenance device 6 of the maintenance device levels the surface of the first part 21 of the ice to the desired height. A laser transmitter 9 is supported on the board 20, and the height of the horizontal laser beam 12 emitted by the transmitter is precisely known. Based on the signal produced by the laser beam receiver 11, the computer 16 of the maintenance device 1 recognizes the height level of the maintenance device and, with the help of the blade adjustment device 10 and/or 17, sets the blade of the ice maintenance device 6 to the correct, desired height. In the situation in the picture, maintenance device 1 has already earlier leveled the ice surface right next to the board 20 of the rink. Now the maintenance device 1 drives close to the board, but in a different direction than the first time. The ice maintenance device 6 is placed on the left side of the maintenance device 1 when viewed from the direction of travel. Thus, in FIG. 1, the ice maintenance device 6 can be seen on the right side of the maintenance device, clearly detached from the board 20. In this way, the leveled first part 21 of the ice surface is formed one drive wider. An edge 23 can be seen between the leveled first part 21 of the ice and the not-yet-leveled second part 22. A regular ice resurfacer (not shown) can continue to level and maintain the ice from here on, to the right in the figure. The ice resurfacer must drive over the edge 23 so that the sensor of the ice resurfacer or other measuring device measures the height of the ice of the already leveled first part 21 and sets the surface of the ice worked by the ice resurfacer always at the same level. Next, the ice resurfacer can measure the desired level of the ice surface also from the ice it has previously driven on.

An LED light strip 24 is placed in the front of the maintenance device. It continuously shows with different colors and/or lights flashing at different speeds whether the maintenance device succeeds in leveling the field surface to the desired height. For example, the light strip can show three different signals: 1) A slowly flashing light, for example a flashing blue color, when the field surface is too low, 2) A continuously burning light, for example a green color when the field surface is at an optimal height, 3) A fast flashing light, for example a flashing red color when the surface of the field is too high. The same information can also be stored in the system memory and displayed, for example, on the screen of the remote control. The information is helpful, for example, to the field maintenance staff for planning follow-up maintenance procedures.

In FIG. 2, the maintenance device 1 is on a grass field cutting its grass. The grass maintenance device 7 of the maintenance device levels the surface of the first part 21 of the grass to the desired height. The grass in the second part 22 has not been cut yet. An edge 23 forms between the first and second parts. Outside the field, a laser transmitter 9 is supported on a stand 25, and the height of the horizontal laser beam 12 the laser transmitter emits is precisely known. The computer 16 of the maintenance device 1 recognizes the height level of the maintenance device based on the signal produced by the laser beam receiver 11 and sets the blade of the grass maintenance device 7 to the correct, desired height using the blade adjustment device. The same maintenance device 1 can mow the grass of the entire grass field. The horizontality of the surface of the grass is not always as important as the horizontality of the ice surface of an ice field. On the other hand, on a grass field, it is often more important that the grass is the same length throughout the field. Therefore, laser beam guidance is not always as useful on grass fields as it is on ice fields. But, for example, if one wishes to make patterns on the grass, the benefit of a precise laser measuring device increases. That is because patterning can be done by cutting the grass in different places to different dimensions.

FIG. 3 shows a sports field maintenance device 1, where the actuator is a transport rack 8 for sports equipment, such as javelins 26, which is attached to shell 5 of the maintenance device 1. The maintenance device 1 is used remotely and perhaps even as an automatically moving robot that can transport, for example, sports equipment thrown onto the field back to the throwing area. FIG. 3 shows how the place 18 of the maintenance device in the lower part of the device 1 is empty. When carrying the javelins 26 is not needed, for example, a grass maintenance device 7 shown in FIG. 2 can be attached to the maintenance device 1. In this way, the same maintenance device 1 can transport sports equipment during competitions or training and at other times work in another function, for example as a grass maintenance device. The rack 8 is attached to the removable part 27 of the shell attached to the rest of shell 5. The part 27 is attached to the rest of the shell 5 with quick connectors (not shown). In this way, the actuator can be changed quickly, for example, when a javelin competition changes to a hammer competition. Only part 27 and with it the rack 8 are removed, and another removable part of the shell with another actuator is attached to the same place. Also, the front part 28 of the shell 5 or some other part can be correspondingly removable and replaceable in order to change the protective properties of the actuator or the shell.

The user interface 29 of the remote control 13 in FIG. 4 can be used to enter control commands to the maintenance device. For example, the user interface can be used to select and start one of the automatic driving programs of the maintenance device stored in the system memory.

The maintenance device 1 in FIG. 6 moves from right to left. The ice maintenance device 6 with blades is on the right side in the direction of travel of the device, against the board 20. The maintenance device 1 therefore levels the ice surface right next to the board 20 of the rink and away from the board by the working width of its cutting blade. The first part 21 leveled to the desired height of the ice surface forms next to the board 20. Between the leveled first part 21 of the ice and the still unleveled second part 22, an edge 23 formed by the cutting blade in the ice can be seen. As explained above in the explanation of FIG. 1, a normal ice resurfacer (not shown) can continue to level and maintain the ice after this drive, taking care of leveling the ice in the rest of the rink, i.e. the second part 22.

The aspects of the disclosed embodiments are not intended to be restricted to the presented examples, rather, the scope of protection is determined by the independent claims. Dependent claims present some advantageous embodiments.

The invention claimed is:

1. A sports field maintenance system comprising:

a remotely operated sports field maintenance device comprising a body and, supported on said body, remotely operated moving devices for moving the maintenance device on the surface of a field at a desired route and speed;

at least one remotely operated actuator for maintaining a first part of the field as desired;

remotely used actuator control devices for controlling position, working height and/or location of the actuator as desired in relation to the body and/or a fixed point outside the maintenance device;

a shell, for protecting the maintenance device and/or for attaching the actuator;

a remote control for entering and/or monitoring control information of the maintenance device;

a computer for processing control information of the maintenance device;

communication means for transferring control information between the computer, the remote control and the maintenance device;

an additional device for maintaining a second part of the field, wherein the additional device comprises:

an actuator for maintaining the second part of the field, and a working height setting device, with which working height of the actuator of the additional device is set based on a surface level of the first part of the field that has already been maintained.

2. The maintenance system according to claim 1, wherein the working height setting device of the actuator of the additional device works automatically.

3. The maintenance system according to claim 1, wherein the actuator can be changed according to maintenance need, whereby the same maintenance device can be equipped with either ice maintenance devices or grass field maintenance devices.

4. The maintenance system according to claim 1, wherein the actuator comprises a leveling device for setting the height of the field surface as desired.

5. The maintenance system according to claim 4, wherein at least one actuator is an ice maintenance device, and the maintenance device is arranged to set an ice surface to the desired height position along a certain working width of the actuator.

6. The maintenance system according to claim 5, wherein at least one actuator is a grass maintenance device, and the maintenance device is arranged to set a grass surface to the desired height position along a certain working width of the actuator.

7. The maintenance system according to claim 1, comprising an automatic maintenance device driving program that can be selected and started by remote control, which program comprises instruction codes for moving devices, for at least one actuator and for actuator control devices with help of which instruction codes the maintenance device automatically performs a series of maintenance procedures defined by the driving program.

8. The maintenance system according to claim 7, comprising a laser-operated control device for controlling the working height of the actuator as desired in relation to the fixed point outside the maintenance device.

9. A method for maintaining a sports field, which method comprises at least the following steps:

maintaining a first part of a field with an actuator of a remotely operated sports field maintenance device;

moving the sports field maintenance device on the surface of the field to be maintained at a desired route and speed with the help of moving devices;

setting position, working height and/or location of the actuator in relation to a body of the maintenance device and/or a fixed point outside the maintenance device as desired with actuator control devices;

protecting the maintenance device with a shell and/or attaching the actuator to the shell;

remotely controlling the field maintenance device and its moving devices, actuator and actuator control devices via a computer and a remote control;

maintaining a second part of the field with an additional device, wherein the second part of the field is maintained with an actuator of the additional device, the working height of the actuator of the additional device is set based on a surface level of the first part of the field already maintained.

10. The method according to claim 9, wherein the working height of the actuator of the additional device is set automatically.

11. The method according to claim 9, wherein the same maintenance device can be equipped with either ice maintenance devices or grass field maintenance devices, whereby the actuator of the maintenance device is changed according to the maintenance need.

12. The method according to claim 9, comprising at least the following steps:

selecting and starting an automatic driving program of the maintenance device by remote control, which program comprises instruction codes for the moving devices, the at least one actuator and the actuator control devices, with the help of which the maintenance device automatically performs a series of maintenance procedures.

13. The method according to claim 9, wherein the height of the field surface is set as desired using a field leveling device as an actuator.

14. The method according to claim 13, comprising at least the following steps:

setting the height of the field surface as desired on the first part of the field surface with the help of the mentioned remotely operated maintenance device;

setting the height of the field surface as desired on the second part of the field surface with the help of the additional device.

15. The method according to claim 14, wherein on the first part of the field surface, the working height of the actuator of the maintenance device is set as desired in relation to the fixed point outside the maintenance device by means of the laser-operated control device.

16. The method according to claim 15, wherein on the second part of the field surface, the working height of the additional device is set as desired based on the height of the surface of the first part of the field already set to the desired height.

17. The method according to claim 16, wherein at least one actuator is an ice maintenance device, whereby with the maintenance device, an ice surface is set to the desired height position along a certain working width of the actuator.

18. The method according to claim 17, wherein the height of the ice field surface is set as desired on the first part of the field surface with the help of a remotely operated ice maintenance device;

the height of the ice field surface is set as desired on the second part of the field surface with the help of a human-driven ice resurfacer.

19. The method according to claim 18, wherein the ice resurfacer is driven over the first part of the field already partially set to the desired height, so that the ice resurfacer measures the height of the surface of the first part and sets the working height of its maintenance device to the same; and later the ice resurfacer is partially driven over the surface of the ice it has already set so that the ice resurfacer measures the height of the surface it has already set, and sets the working height of its maintenance device to the same.

20. The method according to claim 17, wherein the first part of the field surface is an edge of an ice field equipped with a board (20), whereby the surface of the field next to the board is leveled with the help of the remotely operated ice maintenance device.

* * * * *